US012584034B2

(12) United States Patent
Konsa

(10) Patent No.: US 12,584,034 B2
(45) Date of Patent: Mar. 24, 2026

(54) COATING COMPOSITION FOR FORMING A FLEXIBLE DIELECTRIC COAT WITH HIGH DIELECTRIC PERMITTIVITY

(71) Applicant: YELLOW DOT D.O.O., Split (HR)

(72) Inventor: Toni Konsa, Split (HR)

(73) Assignee: TRIBI Technologies d.o.o., Split (HR)

( * ) Notice: Subject to any disclaimer, the term of this patent is extended or adjusted under 35 U.S.C. 154(b) by 0 days.

(21) Appl. No.: 19/014,445

(22) Filed: Jan. 9, 2025

(65) Prior Publication Data

US 2025/0154372 A1 May 15, 2025

Related U.S. Application Data

(63) Continuation of application No. PCT/EP2023/083237, filed on Nov. 27, 2023.

(51) Int. Cl.

| | |
|---|---|
| *C09D 129/00* | (2006.01) |
| *C08K 3/22* | (2006.01) |
| *C08K 5/00* | (2006.01) |
| *C09D 5/08* | (2006.01) |
| *C09D 7/20* | (2018.01) |
| *C09D 7/61* | (2018.01) |
| *C09D 7/65* | (2018.01) |
| *C09D 129/04* | (2006.01) |

(52) U.S. Cl.
CPC .............. *C09D 129/04* (2013.01); *C08K 3/22* (2013.01); *C08K 5/0016* (2013.01); *C09D 5/086* (2013.01); *C09D 7/20* (2018.01); *C09D 7/61* (2018.01); *C09D 7/65* (2018.01); *C08K 2003/2237* (2013.01); *C08K 2003/2289* (2013.01); *C08K 2201/001* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | | |
|---|---|---|---|---|
| 5,698,306 | A | * | 12/1997 | Prose .............. B65D 81/3446 |
| | | | | 219/730 |
| 8,274,084 | B2 | * | 9/2012 | Daniel ................. H10K 10/486 |
| | | | | 257/66 |
| 2005/0216075 | A1 | * | 9/2005 | Wang ...................... A61L 31/18 |
| | | | | 623/1.46 |
| 2008/0012006 | A1 | * | 1/2008 | Bailey ................... H10K 71/18 |
| | | | | 257/40 |
| 2012/0003449 | A1 | * | 1/2012 | Yializis ................. B32B 27/16 |
| | | | | 427/535 |
| 2020/0283653 | A1 | * | 9/2020 | Swisher ............... C09D 11/106 |

FOREIGN PATENT DOCUMENTS

CN            116445044 A       7/2023

OTHER PUBLICATIONS

The International Search Report and Written Opinion dated Apr. 26, 2024 of International Application No. PCT/EP2023/083237.

* cited by examiner

*Primary Examiner* — Stefanie J Cohen
(74) *Attorney, Agent, or Firm* — Tarolli, Sundheim, Covell & Tummino LLP

(57) ABSTRACT

The present invention reveals an improved coating composition for the production of necessary dielectric layers within the radio frequency identification (RFID) tag antennas, that can be applied by spraying, printing, or any other suitable graphic technology. The composition essentially consists of dielectric material such as barium titanate ($BaTiO_3$), of particles size 48-500 nm, 10.00-40.00% w/w, polyvinylpyrrolidone (PVP) as a polymeric dispersant and polyvinyl alcohol (PVOH) as a polymeric binder per 1.00-10.00% w/w each, a water-miscible solvent such as isopropanol, 30.00-55.00% w/w, and up to 100% w/w of demineralized water. The composition according to the present invention is used for forming a flexible dielectric coating in the manufacturing of RFID tags.

13 Claims, No Drawings

COATING COMPOSITION FOR FORMING A FLEXIBLE DIELECTRIC COAT WITH HIGH DIELECTRIC PERMITTIVITY

RELATED APPLICATIONS

This application is a bypass Continuation Application filed under 35 USC 111 (a), claiming priority to Serial No. PCT/EP2023/083237 filed on 27 Nov. 2023, the entirety of which is incorporated herein by reference.

FIELD OF THE INVENTION

The present disclosure is related to the novel coating composition for the preparation of a flexible dielectric coating employed within the radio frequency identification (RFID) antennas, its preparation, and its use.

Technical Problem

The technical problem that is solved by the present disclosure relates to the production of efficient flexible dielectric coating that is employed in the manufacturing of RFID tag antennas. Such dielectric coatings, if highly effective, could significantly improve the performances of said RFID tag antennas in terms of frequency bandwidth, multi-frequency bands, gain, and half-power bandwidth.

Furthermore, the technical problem that is solved by the present invention is related to the current wide use of coatings that are made from toxic and environmentally dangerous chemicals.

PRIOR ART

The rapid development of electronic devices largely depends on high-performance dielectric materials and high-throughput production of cheap electronic components. One of them is radio frequency identification (RFID) antennas that have found a wide application in mobile phone antennas, drone antennas, IoT device antennas, home appliances, automobile industry, logistics, aerospace, biomedicine, mining, and other fields. Designing of modern RF antenna setup requires careful consideration of material, geometric, and fabrication parameters. Antenna design and properties of polymer matrix composite (PMC) including type and properties of employed dielectric largely influence its resulting properties such as gain, bandwidth, impedance matching, thermal properties, operating frequencies, etc., see literature references 1-3:

1) C. Varadhan, F. A. Chamatu, S. Arulselvi: Characterization of Composite RFID Antennas Based on Thermal Properties: A Survey, *Adv. Mater. Sci. Eng.* (2021) 8905489;

2) A. A. Babar, V. A. Bhagavati, L. Ukkonen, A. Z. Elsherbeni, P. Kallio, L. Sydänheimo: Performance of High-Permittivity Ceramic-Polymer Composite as a Substrate for UHF RFID Tag Antennas, *Int. J. Antennas Propag.* (2012) 905409; and 3) Q.-Y. Tang, Y.-M. Pan, Y. C. Chan, K. W. Leung: Frequency-tunable soft composite antennas for wireless sensing, *Sens. Actuator A Phys.* 179 (2012) 137-145.

Among the most important dielectric materials are different ceramic substances such as barium titanate ($BaTiO_3$), barium strontium titanate, and strontium titanate ($SrTiO_3$), see literature references 2 and 4:

4) L. Zhou, Y. Jiang, D. Chu: Synthesis and Dielectric Properties of Printable Strontium Titanate/Polyvinylpyrrolidone Nanocomposite, *Mater. Res. Express* 6 (2019) 0950c6.

Different polymeric material has been employed for the manufacturing of RFID antennas, including polydimethylsiloxane (PDMS), polyvinylidene fluoride (PVDF), polymethyl methacrylate (PMMA), polyvinylpyrrolidone (PVP), and some other polymers with low dielectric loss, see literature references 4 and 5:

5) H. Deng, Y. Wei, H. Jing, R. Zhang, Q. Chen, J. Wang, Z. Qu, J. Duan, B. Zhang: Flexible ultra-wideband cartoon-shaped antenna based on a composite with customizable dielectric properties, *Smart Mater. Struct.* 31 (2022) 095016.

The RFID tag antennas can be manufactured by different graphic technologies, for instance, inkjet printing, spray coating, stencil printing, or screen printing. Furthermore, the biggest RFID tag antenna large-scale manufacturing processes are roll-to-roll (R2R), sheet-to-sheet (S2S), and hybrid methods. The solution depends on the thickness and concentration of the dielectric layer applied. Large-scale manufacturing processes can use an elastic composite or a liquid adhesive doped with particles that have high permittivity and permeability. For instance, an elastomer or other thermoplastic polymers doped with nanoparticles, and microparticles with high relative permittivity and permeability. Usually, these antennas are monopoles, dipoles, IFA, PIFA, patch, log-periodic, whip, slot, microstrip, helical, and ceramic chip antennas. When combined with dielectric materials these antennas have a multi-band frequency and increased gain compared to other electrically small antennas. Said common technologies for the manufacturing of RFID antennas are known in the art, for instance, see literature reference 6:

6) C. L. Baumbauer, M. G. Anderson, J. Ting, A. Sreekumar, J. M. Rabaey, A. C. Arias, A. Thielens: Printed, flexible, compact UHF-RFID sensor tags enabled by hybrid electronics, *Sci. Rep.* 10 (2020) 16543.

The technical problem of manufacturing flexible, highly effective RFID tag antennas of high performance regarding their key properties such as increased frequency bandwidth, multi-frequency bands, increased gain, and increased half-power bandwidth has been solved by the present invention by the use of a novel coating composition for making a flexible dielectric coating as disclosed in the following sections.

SUMMARY OF THE INVENTION

The subject disclosure reveals a novel coating composition for forming a flexible dielectric coat with high dielectric permittivity, comprising:

(i) a dielectric material selected from the group consisting of barium titanate ($BaTiO_3$), strontium titanate ($SrTiO_3$), calcium copper titanate ($CaCu_3Ti_4O_{12}$), cobalt (II) oxide (CoO), cobalt (II, III oxide) ($Co_3O_4$), titanium dioxide ($TiO_2$), aluminum oxide ($Al_2O_3$), lanthanum oxide ($La_2O_3$), conjugate polymers (CP), or mixtures of these substances, of particles size 48-500 nm, from 10.00-40.00% w/W, (ii) polymeric dispersant, from 1.00-10.00% w/w, (iii) polymeric binder, from 1.00-10.00% w/w.

(iv) water-miscible organic solvent, from 30.00-55.00% w/w, (v) optional, one or more auxiliary ingredients required for achieving particular technological properties of the resulting composition during the application via spraying or printing such as surfactant, wetting agent, plasticizer, anti-foaming agent, corrosion inhibitor, and antioxidant, from 0.00-2.00% w/w, and (vi) demineralized water, up to 100.00% of the composition, where within the said formulation, polyvinylpyrrolidone (PVP) is used as the polymeric dispersant, polyvinyl alcohol (PVOH) is used as the polymeric binder, and the water-miscible solvent is selected from the group consisting of isopropanol, n-propanol, or mixtures of isopropanol and n-propanol in any weight ratio with low molecular weight aliphatic alcohols (ROH) such as methanol, ethanol, n-butanol, isobutanol, sec-butanol, tert-butanol in relative ratio:

isopropanol and/or n-propanol:ROH=1:3-3:1, w/w.

In a particular embodiment of the present disclosure, the conjugated polymer (CP) is selected from the group comprising polyaniline (PANI), polyparaphenylene (PPP), poly (p-phenylene vinylene) (PPV), poly[2,5-di-(alkoxy)-p-phenylene vinylene], polyacetylene (PAC), polyheptadiyne (PHT), polythiophene (PTH), poly(3-alkylthiophenes) (P3AT) like poly(3-hexylthiophene) (P3HT), polypyrrole (PPy), ladder-type polyphenylene (LPPP), or mixtures of these polymers.

In a preferred embodiment of the subject invention, polyvinylpyrrolidone (PVP), as a polymeric dispersant, is selected from the grades of the product with relative molecular weight ($M_r$) 2,000-1,200,000, preferably of $M_r$ 44,000-54,000 with average $M_r$ 40,000.

In further preferred embodiment of the subject disclosure polyvinyl alcohol (PVOH), as a polymeric binder, is selected from the grades of the product with relative molecular weight ($M_r$) 10,000-500,000, and a hydrolysis degree of 85.0-100%, where PVOH of $M_r$ 30,000-200,000 being preferred.

In a particularly preferred embodiment of the present invention, the water-miscible solvent is isopropanol.

In further preferred embodiment of the subject invention, the composition comprises the components with the following weight percentages:

(i) 15.00-30.00% w/w, (ii) 2.00-6.00% w/w, (iii) 2.00-6.00 w/W (iv) 35.00-50.00% w/w, (v) optional sodium lauryl sulfate, from 0.00-0.10% w/w, and (vi) 25.00-40.00% w/w.

Additionally, in a particularly preferred embodiment of the subject disclosure, the composition comprises the components with the following weight percentages:

(i) 15.00-30.00% w/w, (ii) 3.50-4.50% w/w, (iii) 3.50-4.50 w/w (iv) 38.00-45.00% w/w, (v) sodium lauryl sulfate, from 0.05-0.10% w/w, and (vi) 30.00-35.00% w/w.

Optionally, the coating composition from the present invention comprises the surfactant characterized by the hydrophilic-lipophilic balance (HLB) factor of 13-40, and is selected from the group comprising:

surfactants such as anionic surfactants like sodium stearate, sodium lauryl sulfate, sodium laureth sulfate, or potassium cetyl phosphate, non-ionic surfactants like polyoxyethylene(20) stearyl ether, sorbitan monooleate, coco glucoside, or cocodiethanolamide; zwitterionic surfactants like cocoamidopropyl betaine, or cationic surfactants like benzalkonium chloride or stearyl trimethylammonium chloride, or mixtures of these substances.

Additionally, in a further optional embodiment of the subject disclosure, the coating composition comprises the wetting agent is characterized by the hydrophilic-lipophilic balance (HLB) factor of 7-13 and is selected from the group comprising:

alkoxylated linear chain saturated or unsaturated fatty alcohols with C8-C18 carbon atoms with integrated 2-8 ethylene oxide (EO) units like polyoxyethylene(4) lauryl ether, ammonium or alkali metal sulfosuccinates like sodium bis(2-ethylhexyl)sulfosuccinate, or mixtures of these substances.

Optionally, the coating composition from the present invention comprises the plasticizer selected from the group comprising epoxidized soybean oil (ESBO), epoxidized linseed oil (ELO), 3-hydroxy-2,2,4-trimethylpentyl isobutyrate, sebacates such as di-octyl sebacate, 1,2-cyclohexane dicarboxylic acid diisononyl ester, bis(butylcarbitol)formal, or mixtures of these substances.

Additionally, in a further optional embodiment of the subject disclosure, the coating composition comprises the anti-foaming agent selected from the group comprising silicone oils such as polydimethylsiloxane, C6-C22 higher fatty alcohols, mineral oil, or mixtures of these substances.

Optionally, the coating composition from the present invention comprises the corrosion inhibitor selected from the group comprising:

inorganic salts such as sodium or potassium silicate, sodium or potassium borate or tetraborate, tripotassium t or trisodium phosphates, potassium or sodium nitrite, mercaptobenzothiazole (MBT), primary, secondary, or tertiary amines, diamines, or triamines from C2-C8 alkyl groups like n-butylamine, diisopropylamine, triethylamine, ethylenediamine, or dipropylene triamine (DPTA), primary, secondary, or tertiary hydroxy alkylamines or alkoxy alkylamines such as ethanolamine, methyl diethanolamine, and 3-methoxypropylamine, cyclic amines such as morpholine, piperazine, or their mono- or di-alkyl derivatives with 1-6 carbon atoms in the alkyl group like N-methyl-morpholine or 1,4-dimethyl-piperazine, or salts of said amines with weak acids such as carboxylic acid like acetic, benzoic, citric acid, 4-oxo-4-(para-tolyl) butyric acid, or mixtures of these substances.

Additionally, in a further optional embodiment of the subject disclosure, the coating composition comprises one or more antioxidants selected from the group comprising 2,6-di-tert-butyl-4-methylphenol (BHT), butylated hydroxyanisole (BHA), 2,4-dimethyl-6-tert-butylphenol, N,N'-di-(2-butyl)-1,4-phenylene diamine, without or with one or more auxiliary antioxidant such as disodium edetate dihydrate ($Na_2EDTA \cdot 2H_2O$), or trisodium citrate dihydrate ($Na_3C_6H_5O_7 \cdot 2H_2O$), or sodium phytate [$Na_{12}C_6H_6(OPO_3)_6$].

The preparation of the coating composition according to the present invention includes the following manufacturing steps:

A. homogenization of polymeric dispersant, polymeric binder, and one or more optional auxiliary ingredients in demineralized water at 10-80° C., preferably at 15-40° C. with stirring at 25-500 revolutions per minute, for 10-60 minutes, preferably under ultrasonic (US) irradiation at 200 kHz-1 MHz and energy of US irradiation from 50-200 W/1,000 mL of the liquid mixture, B. separately, homogenization of powderous dielectric material in one or more water-miscible organic solvents at 10-80° C., preferably at 15-40° C. with stirring at 25-500 revolutions per minute, for 10-60 minutes, preferably under ultrasonic (US) irradiation at 200 kHz-1 MHz and energy of US irradiation from 50-200 W/1,000 mL of the liquid mixture, C. combining the products from phase A and phase B and their homogenization of products at 10-80° C., preferably at 15-40° C. with stirring at 25-500 revolutions per minute, for 10-60 minutes, preferably under ultrasonic (US) irradiation at 200 KHz-1 MHz and energy of US irradiation from 50-200 W/1,000 mL of the resulting liquid mixture, yielding the said composition in the form of a viscous liquid suspension.

The coating composition according to the present invention is used for the formation of a flexible coating having high dielectric permittivity, by spraying or screen printing. Particularly, the coating composition according to the present invention is employed in RFID manufacturing, where the said coating is used for impedance matching, and where the said coating acts as a dielectric resonator for the antenna which increases the performance of the RFID's antenna.

DETAILED DESCRIPTION OF THE INVENTION

The present disclosure reveals a novel coating composition for forming a flexible dielectric coat with high dielectric permittivity, comprising:

(i) a dielectric material selected from the group consisting of barium titanate ($BaTiO_3$), strontium titanate ($SrTiO_3$), calcium copper titanate ($CaCu_3Ti_4O_{12}$), cobalt (II) oxide (CoO), cobalt (II, III oxide) ($Co_3O_4$) titanium dioxide ($TiO_2$), aluminum oxide ($Al_2O_3$), lanthanum oxide ($La_2O_3$), conjugate polymers (CP), or mixtures of these substances, of particles size 48-500 nm, from 10.00-40.00% w/w, (ii) polymeric dispersant, from 1.00-10.00% w/w, (iii) polymeric binder, from 1.00-10.00% w/w, (iv) water-miscible organic solvent, from 30.00-55.00% w/w, (v) optional, one or more auxiliary ingredients required for achieving particular technological properties of the resulting composition during the application via spraying or printing such as surfactant, wetting agent, plasticizer, anti-foaming agent, corrosion inhibitor, and antioxidant, from 0.00-2.00% w/w, and (vi) demineralized water, up to 100.00% of the composition, where within the said formulation, polyvinylpyrrolidone (PVP) is used as the polymeric dispersant, polyvinyl alcohol (PVOH) is used as the polymeric binder, and the water-miscible solvent is selected from the group consisting of isopropanol, n-propanol, or mixtures of isopropanol and N-propanol in any weight ratio with low molecular weight aliphatic alcohols (ROH) such as methanol, ethanol, n-butanol, isobutanol, sec-butanol, tert-butanol in relative ratio:

isopropanol and/or n-propanol:ROH=1:3-3:1, w/w.

In a particular embodiment of the present disclosure, the conjugated polymer (CP) is selected from the group comprising polyaniline (PANI), polyparaphenylene (PPP), poly(p-phenylene vinylene) (PPV), poly[2,5-di-(alkoxy)-p-phenylene vinylene], polyacetylene (PAC), polyheptadiyne (PHT), polythiophene (PTH), poly(3-alkylthiophenes) (P3AT) like poly(3-hexylthiophene) (P3HT), polypyrrole (PPy), ladder-type polyphenylene (LPPP), or mixtures of these polymers.

In a preferred embodiment of the subject invention, polyvinylpyrrolidone (PVP), as a polymeric dispersant, is selected from the grades of the product with relative molecular weight ($M_r$) 2,000-1,200,000, preferably of $M_r$ 44,000-54,000 with average $M_r$ 40,000.

In further preferred embodiment of the subject disclosure polyvinyl alcohol (PVOH), as a polymeric binder, is selected from the grades of the product with relative molecular weight ($M_r$) 10,000-500,000, and a hydrolysis degree of 85.0-100%, where PVOH of $M_r$ 30,000-200,000 being preferred.

In a particularly preferred embodiment of the present invention, the water-miscible solvent is isopropanol.

In further preferred embodiment of the subject invention, the composition comprises the components with the following weight percentages:

(i) 15.00-30.00% w/W, (ii) 2.00-6.00% w/w, (iii) 2.00-6.00 w/w (iv) 35.00-50.00% w/w, (v) optional sodium lauryl sulfate, from 0.00-0.10% w/w, and (vi) 25.00-40.00% w/w.

Additionally, in a particularly preferred embodiment of the subject disclosure, the composition comprises the components with the following weight percentages:

(i) 15.00-30.00% w/w, (ii) 3.50-4.50% w/w, (iii) 3.50-4.50 w/W (iv) 38.00-45.00% w/W, (v) sodium lauryl sulfate, from 0.05-0.10% w/w, and (vi) 30.00-35.00% w/w.

Optionally, the coating composition from the present invention comprises the surfactant characterized by the hydrophilic-lipophilic balance (HLB) factor of 13-40, and is selected from the group comprising:

surfactants such as anionic surfactants like sodium stearate, sodium lauryl sulfate, sodium laureth sulfate, or potassium cetyl phosphate, non-ionic surfactants like polyoxyethylene(20) stearyl ether, sorbitan monooleate, coco glucoside, or cocodiethanolamide; zwitterionic surfactants like cocoamidopropyl betaine, or cationic surfactants like benzalkonium chloride or stearyl trimethylammonium chloride, or mixtures of these substances.

Additionally, in a further optional embodiment of the subject disclosure, the coating composition comprises the wetting agent is characterized by the hydrophilic-lipophilic balance (HLB) factor of 7-13 and is selected from the group comprising:

alkoxylated linear chain saturated or unsaturated fatty alcohols with C8-C18 carbon atoms with integrated 2-8 ethylene oxide (EO) units like polyoxyethylene (4) lauryl ether, ammonium or alkali metal sulfosuccinates like sodium bis(2-ethylhexyl) sulfosuccinate, or mixtures of these substances.

Optionally, the coating composition from the present invention comprises the plasticizer selected from the group comprising epoxidized soybean oil (ESBO), epoxidized linseed oil (ELO), 3-hydroxy-2,2,4-trimethylpentyl isobutyrate, sebacates such as di-octyl sebacate, 1,2-cyclohexane dicarboxylic acid diisononyl ester, bis(butylcarbitol) formal, or mixtures of these substances.

Additionally, in a further optional embodiment of the subject disclosure, the coating composition comprises the anti-foaming agent selected from the group comprising silicone oils such as polydimethylsiloxane, C6-C22 higher fatty alcohols, mineral oil, or mixtures of these substances.

Optionally, the coating composition from the present invention comprises the corrosion inhibitor is selected from the group comprising:

inorganic salts such as sodium or potassium silicate, sodium or potassium borate or tetraborate, tripotassium or trisodium phosphates, potassium or sodium nitrite, mercaptobenzothiazole (MBT), primary, secondary, or tertiary amines, diamines, or triamines from C2-C8 alkyl groups like n-butylamine, diisopropylamine, triethylamine, ethylenediamine, or dipropylene triamine <DPTA>, primary, secondary, or tertiary hydroxy alkylamines or alkoxy alkylamines such as ethanolamine, methyl diethanolamine, and 3-methoxypropylamine, cyclic amines such as morpholine, piperazine, or their mono- or di-alkyl derivatives with 1-6 carbon atoms in the alkyl group like N-methyl-morpholine or 1,4-dimethyl-piperazine, or salts of said amines with weak acids such as carboxylic acid like acetic, benzoic, citric acid, 4-oxo-4-(para-tolyl) butyric acid, or mixtures of these substances.

Additionally, in a further optional embodiment of the subject disclosure, the coating composition comprises one or more antioxidants selected from the group comprising 2,6-di-tert-butyl-4-methylphenol (BHT), butylated hydroxyanisole (BHA), 2,4-dimethyl-6-tert-butylphenol, N,N'-di-(2-butyl)-1,4-phenylene diamine, without or with one or more auxiliary antioxidant such as disodium edetate dihydrate ($Na_2EDTA \cdot 2H_2O$), or trisodium citrate dihydrate ($Na_3C_6H_5O_7 \cdot 2H_2O$), or sodium phytate [$Na_{12}C_6H_6(OPO_3)_6$].

Preparation of the Coating Composition According to the Subject Disclosure

The preparation of the coating composition according to the present invention includes the following manufacturing steps:

A. homogenization of polymeric dispersant, polymeric binder, and one or more optional auxiliary ingredients in demineralized water at 10-80° C., preferably at 15-40° C. with stirring at 25-500 revolutions per minute, for 10-60 minutes, preferably under ultrasonic (US) irradiation at 200 kHz-1 MHz and energy of US irradiation from 50-200 W/1,000 mL of the liquid mixture, B. separately, homogenization of powderous dielectric material in one or more water-miscible organic solvents at 10-80° C., preferably at 15-40° C. with stirring at 25-500 revolutions per minute, for 10-60 minutes, preferably under ultrasonic (US) irradiation at 200 kHz-1 MHz and energy of US irradiation from 50-200 W/1,000 mL of the liquid mixture, C. combining the products from phase A and phase B and their homogenization of products at 10-80° C., preferably at 15-40° C. with stirring at 25-500 revolutions per minute, for 10-60 minutes, preferably under ultrasonic (US) irradiation at 200 kHz-1 MHz and energy of US irradiation from 50-200 W/1,000 mL of the resulting liquid mixture, yielding the said composition in the form of a viscous liquid suspension.

Typical experimental procedures for the preparation of the coating composition from the subject disclosure are disclosed in Examples 1-6.

Use of the Coating Composition According to the Subject Disclosure

The coating composition according to the present invention is used for the formation of a flexible coating having high dielectric permittivity, by spraying or screen printing.

Particularly, the coating composition according to the present invention is employed in RFID manufacturing, where the said coating is used for impedance matching, and where the said coating acts as a dielectric resonator for the antenna which increases the performance of the RFID's antenna.

The coating composition according to the present invention provides a flexible dielectric coating within the RFID tag antennas. The effects of the flexible coat obtained from the subject composition include very high permittivity and permeability, increased frequency bandwidth, multi-frequency bands, increased gain, and increased half-power bandwidth. It improves read range on lossy materials, increases sensitivity, increases the read angles, can be used to match impedances, and has the option of making the tag electrically smaller. It can be also applied to other antennas in various industries. The mobile device, IoT, and UAV industries use PIFAs, helical antennas, dipoles antennas, and other antenna types.

In the real case measurements conducted with a high dielectric value film attached to various RFID tags, the signal gain was significantly increased by 25 dB to 30 dB. In wireless edge devices with a long life, this could mean a one thousand times decrease in communications power consumption and a significantly improved working of the device.

EXAMPLES

General Remarks

The term "room temperature" refers to a temperature interval of 20-25° C. The stirring speed is expressed in the number of revolutions per minute (r.p.m.) of the mixing element.

For the measurement of dynamic viscosity ($\eta$), parallel plate geometry was employed, with a parallel plate gap of 0.2 mm. Element definition: ID2: set temperature 25° C., t=20.00 [s]; ID3: rot steps; CR; y0.01000 1/s-1.000·$10^4$ 1/s log; t<520,00 [s]; 40 steps; T=25° C.

Example 1. Preparation of the Coating Composition According to the Present Disclosure Composition (1000 g of the coating composition):
(1) 30.00% (300.00 g) demineralized water;[a]

(2) 5.00% (50.00 g) polymeric dispersant: polyvinylpyr-rolidone (PVP) of type Kollidon 30 ($M_r$=44,000-54,000);[b]

(3) 5.00% (50.00 g) polymeric binder: polyvinylalcohol (PVOH) of type Vivapharm PVA 05 fine; degree of hydrolysis: 85-89 mol %;[c]

(4) 30.00% (300.00 g) water-miscible solvent: isopropanol;[d] and (5) 30.00% (300.00 g) powderous dielectric material: barium titanate ($BaTiO_3$; crystal form: tetragonal; purity: ≥99.95%; average particles size: 370 nm).[e]

Total: 100.00% (1000.00 g)

Preparation

A. The homogenization of polymeric dispersant (2) and polymeric binder (3) in demineralized water (1) was performed at 45-50° C., with stirring at 100-150 r.p.m. for 15-20 minutes, under ultrasonic (US) irradiation at 200 kHz and energy of US irradiation of 50 W/L of the liquid mixture.

B. Separately, the homogenization of powderous dielectric material (5) with a water-miscible organic solvent (4) was carried out at 45-50° C. with stirring at 100-150 r.p.m. for 15-20 minutes, under US irradiation at 200 kHz and energy of the US irradiation of 50 W/L of the liquid mixture.

C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture, which was subsequently cooled to r.t. with stirring, yielding the said composition in the form of a white-coloured, viscous, liquid suspension of a mild characteristic odour resembling isopropanol. The final product was packed into suitable metal or plastic containers.

Starting materials: [a] Product of company KG Zelina, Croatia; [b] Product of company BASF AG, Germany; [c] Product of company JRS Pharma GmbH & Co. KG, Germany; [d] Product of company Carlo Erba Reagents s.r.l., Italy; [e] Product of company Nanografi Nanotechnology, Turkey.

Example 2. Preparation of the Coating Composition According to the Subject Disclosure Composition (1000 g of the coating composition):

(1) 25.00% (250.00 g) demineralized water;[a]

(2) 4.00% (40.00 g) polymeric dispersant: polyvinylpyr-rolidone (PVP) of type Kollidon 30 ($M_r$=44,000-54,000);[b]

(3) 6.00% (60.00 g) polymeric binder: polyvinylalcohol (PVOH) of type Vivapharm PVA 05 fine; degree of hydrolysis: 85-89 mol %;[c]

(4) 30.00% (300.00 g) water-miscible solvent: isopropanol;[d] and (5) 35.00% (350.00 g) powderous dielectric material: barium titanate [calcium copper titanate, $CaTiO_3\cdot3CuTiO_3$; purity: ≥99.58; average particles size, $D_{50}$=360 nm].[e]

Total: 100.00% (1000.00 g)

Preparation

A. The homogenization of polymeric dispersant (2) and polymeric binder (3) in demineralized water (1) was performed at 75-80° C., with stirring at 100-150 r.p.m. for 15-20 minutes, under ultrasonic (US) irradiation at 200 kHz and energy of US irradiation of 50 W/L of the liquid mixture.

B. Separately, the homogenization of powderous dielectric material (5) with a water-miscible organic solvent (4) was carried out at 75-80° C. with stirring at 100-150 r.p.m. for 15-20 minutes, under US irradiation at 200 kHz and energy of the US irradiation of 50 W/L of the liquid mixture.

C. The products from phase A and phase B were combined and homogenized by stirring at 100-150 r.p.m. at 75-80° C. for 15-20 minutes, under US irradiation at 200 kHz and energy of US irradiation of 50 W/L of the resulting liquid mixture, which was subsequently cooled to r.t. with stirring, yielding the said composition in the form of a brown-coloured, viscous, liquid suspension of a mild characteristic odour resembling isopropanol. The final product was packed into suitable metal or plastic containers.

Starting materials: [a] Product of company KG Zelina, Croatia; [b] Product of company BASF AG, Germany; [c] Product of company JRS Pharma GmbH & Co. KG, Germany; [d] Product of company Carlo Erba Reagents s.r.l., Italy; [e] Product of company Nanografi Nanotechnology, Turkey.

Example 3. Preparation of the Coating Composition According to the Present Disclosure Composition (1000 g of the coating composition):

(1) 30.00% (300.00 g) demineralized water;[a]

(2) 8.00% (80.00 g) polymeric dispersant: polyvinylpyr-rolidone (PVP) of type Kollidon 30 ($M_r$=44,000-54,000);[b]

(3) 7.00% (70.00 g) polymeric binder: polyvinylalcohol (PVOH) of type Vivapharm PVA 05 fine; degree of hydrolysis: 85-89 mol %;[c]

(4) 25.00% (250.00 g) water-miscible solvent: isopropanol;[d]

(5) 20.00% (200.00 g) water-miscible solvent: n-propanol;[d] and (6) 10.00% (100.00 g) powderous dielectric material: cobalt (II, III) oxide ($Co_3O_4$; purity: ≥99.77%; average particles size: 48 nm).[e]

Total: 100.00% (1000.00 g)

Preparation

A. The homogenization of polymeric dispersant (2) and polymeric binder (3) in demineralized water (1) was performed at r.t., with stirring at 450-500 r.p.m. for 20-30 minutes, under ultrasonic (US) irradiation at 1 MHz and energy of US irradiation of 200 W/L of the liquid mixture.

B. Separately, the homogenization of powderous dielectric material (6) with water-miscible organic solvents (4) and (5) was carried out at r.t. with stirring at 450-500 r.p.m. for 20-30 minutes, under US irradiation at 1 MHz and energy of the US irradiation of 200 W/L of the liquid mixture.

C. The products from phase A and phase B were combined and homogenized by stirring at 450-500 r.p.m. at r.t. for 20-30 minutes, under US irradiation at 1 MHz and energy of US irradiation of 200 W/L of the resulting liquid mixture, yielding the said composition in the form of a black-coloured, viscous, liquid suspension of a mild characteristic odour resembling isopropanol and n-propanol. The final product was packed into suitable metal or plastic containers.

Starting materials: [a] Product of company KG Zelina, Croatia; [b] Product of company BASF AG, Germany; [c] Product of company JRS Pharma GmbH & Co. KG, Germany; [d] Product of company Carlo Erba Reagents s.r.l., Italy; [e] Product of company Nanografi Nanotechnology, Turkey.

Example 4. Preparation of the Coating Composition According to the Subject Disclosure Composition (1000 g of the coating composition):
(1) 26.00% (260.00 g) demineralized water;[a]
(2) 1.00% (10.00 g) polymeric dispersant: polyvinylpyrrolidone (PVP) of type Kollidon 90 ($M_r$=900,000-1,200,000);[b]
(3) 10.00% (100.00 g) polymeric binder: polyvinylalcohol (PVOH) of type Vivapharm PVA 05 fine; degree of hydrolysis: 85-89 mol %;[c]
(4) 15.00% (150.00 g) water-miscible solvent: isopropanol;[d]
(5) 10.00% (100.00 g) water-miscible solvent: n-propanol;[d]
(6) 5.00% (50.00 g) water-miscible solvent: n-butanol;[d] and
(7) 33.00% (330.00 g) powderous dielectric material: barium titanate (BaTiO$_3$; crystal form: tetragonal; purity: ≥99.95%; average particles size: 370 nm).[e]
Total: 100.00% (1000.00 g)

Preparation

A. The homogenization of polymeric dispersant (2) and polymeric binder (3) in demineralized water (1) was performed at 45-50° C., with stirring at 100-150 r.p.m. for 15-20 minutes, under ultrasonic (US) irradiation at 200 kHz and energy of US irradiation of 50 W/L of the liquid mixture,
B. Separately, the homogenization of powderous dielectric material (7) with water-miscible organic solvents (4), (5), and (6) was carried out at 45-50° C. with stirring at 100-150 r.p.m. for 15-20 minutes, under US irradiation at 200 kHz and energy of the US irradiation of 50 W/L of the liquid mixture.
C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture,
which was subsequently cooled to r.t. with stirring, yielding the said composition in the form of a white-coloured, viscous, liquid suspension of a mild characteristic odour resembling isopropanol and n-butanol. The final product was packed into suitable metal or plastic containers.

Starting materials: [a] Product of company KG Zelina, Croatia; [b] Product of company BASF AG, Germany; [c] Product of company JRS Pharma GrabH & Co. KG, Germany; [d] Product of company Carlo Erba Reagents s.r.l., Italy; [e] Product of company Nanografi Nanotechnology, Turkey,

Example 5. Preparation of the Coating Composition According to the Present Disclosure Composition (1000 g of the coating composition):
(1) 22.65% (226.50 g) demineralized water;[a]

(2) 0.35% (3.50 g) surfactant: sodium laurylsulfate of type Texapon LS 30;[b]
(3) 3.00% (30.00 g) polymeric dispersant: polyvinylpyrrolidone (PVP) of type Kollidon 30 ($M_r$=44,000-54,000);[b]
(4) 4.00% (40.00 g) polymeric binder: polyvinylalcohol (PVOH) of type Selvol PVOH 504; degree of hydrolysis: 87.0-89.0 mol %;[c]
(5) 35.00% (350.00 g) water-miscible solvent: isopropanol;[d] and
(6) 35.00% (350.00 g) powderous dielectric material: barium titanate (BaTiO$_3$; crystal form: tetragonal; purity: ≥99.95%; average particles size: 370 nm).[e]
Total: 100.00% (1000.00 g)

Preparation

A. The homogenization of surfactant (2), polymeric dispersant (3), and polymeric binder (4) in demineralized water (1) was performed at 45-50° C., with stirring at 100-150 r.p.m. for 15-20 minutes, under ultrasonic (US) irradiation at 200 kHz and energy of US irradiation of 50 W/L of the liquid mixture.
B. Separately, the homogenization of powderous dielectric material (6) with a water-miscible organic solvent (5) was carried out at 45-50° C. with stirring at 100-150 r.p.m. for 15-20 minutes, under US irradiation at 200 kHz and energy of the US irradiation of 50 W/L of the liquid mixture.
C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture,
which was subsequently cooled to r.t. with stirring, yielding the said composition in the form of a white-coloured, viscous, liquid suspension of a mild characteristic odour resembling isopropanol. The final product was packed into suitable metal or plastic containers.

Starting materials: [a] Product of company KG Zelina, Croatia; [b] Product of company BASF AG, Germany; [c] Product of company Sekisui Specialty Chemicals Europe S.L, Spain; [d] Product of company Carlo Erba Reagents s.r.l., Italy; [e] Product of company Nanografi Nanotechnology, Turkey.

Example 6. Preparation of the Coating Composition According to the Subject Disclosure Composition (1000 g of the coating composition):
(1) 27.07% (270.70 g) demineralized water;[a]
(2) 0.35% (3.50 g) surfactant: sodium laurylsulfate of type Texapon LS 30;[b]
(3) 0.20% (2.00 g) wetting agent: sodium dioctylsulfosuccinate of type Hydropalat WE 3489;[b]
(4) 3.00% (30.00 g) polymeric dispersant: polyvinylpyrrolidone (PVP) of type Kollidon 30 ($M_r$=44,000-54,000);[b]
(5) 4.00% (40.00 g) polymeric binder: polyvinylalcohol (PVOH) of type Selvol PVOH 504; degree of hydrolysis: 87.0-89.0 mol %;[c]
(6) 35.00% (350.00 g) water-miscible solvent: isopropanol;[d] and
(7) 0.25% (2.50 g) plasticizer: epoxidized soybean oil of type Efka PL 5381;[b]
(8) 0.10% (1.00 g) defoaming agent: polysiloxane-based of type BYK-024;[e]

(9) 0.02% (0.20 g) corrosion inhibitor: 2-mercaptobenzo-thiazole (2MBT);[f]

(10) 0.01% (0.10 g) antioxidant: butylated hydroxytolu-ene (BHT; 2,6-di-tert-butyl-4-methyl-phenol);[g]

(11) 30.00% (300.00 g) powderous dielectric material: barium titanate ($BaTiO_3$; crystal form: tetragonal; purity: ≥99.95%; average particles size: 370 nm).[h]

Total: 100.00% (1000.00 g)

Preparation

A. The homogenization of surfactant (2), wetting agent (3), polymeric dispersant (4), and polymeric binder (5) in demineralized water (1) was performed at 45-50° C., with stirring at 100-150 r.p.m. for 15-20 minutes, under ultrasonic (US) irradiation at 200 kHz and energy of US irradiation of 50 W/L of the liquid mixture.

B. Separately, the homogenization of powderous dielec-tric material (11) with a water-miscible organic solvent (6), plasticizer (7), defoaming agent (8), corrosion inhibitor (9), and antioxidant (10) was carried out at 45-50° C. with stirring at 100-150 r.p.m. for 15-20 minutes, under US irradiation at 200 kHz and energy of the US irradiation of 50 W/L of the liquid mixture.

C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture, which was subsequently cooled to r.t. with stirring, yielding the said composition in the form of a white-coloured, viscous, liquid suspension of a mild characteristic odour resembling isopropanol. The final product was packed into suitable metal or plastic containers.

Starting materials: [a] Product of company KG Zelina, Croatia; [b] Product of company BASF AG, Germany; [c] Product of company Sekisui Specialty Chemicals Europe S.L, Spain; [d] Product of company Carlo Erba Reagents s.r.l., Italy; [e] Product of company BYK-Chemie GmbH, Germany; [f] Product of company Sigma-Aldrich Corporation, USA; [g] Product of company Merck KGaA, Germany; [h] Product of company Nanografi Nanotechnology, Turkey.

Example 7. Preparation of the Coating Composition According to the Present Disclosure Composition (1000 g of the coating composition):

(1) 32.30% (323.00 g) demineralized water;[a]

(2) 4.00% (40.00 g) polymeric dispersant: polyvinylpyr-rolidone (PVP) of type Kollidon 30 ($M_r$=44,000-54,000);[b]

(3) 7.00% (70.00 g) polymeric binder: polyvinylalcohol (PVOH) of type Vivapharm PVA 05 fine; degree of hydrolysis: 85-89 mol %;[c]

(4) 44.00% (440.00 g) water-miscible solvent: isopropa-nol;[d] and (5) 12.70% (127.00 g) powderous dielectric material: barium titanate ($BaTiO_3$; crystal form: tetragonal; purity: ≥99.95%; average particles size: 370 nm).[e]

Total: 100.00% (1000.00 g)

Preparation

A. The homogenization of polymeric dispersant (2) and polymeric binder (3) in demineralized water (1) was performed at 45-50° C., with stirring at 100-150 r.p.m.

for 15-20 minutes, under ultrasonic (US) irradiation at 200 kHz and energy of US irradiation of 50 W/L of the liquid mixture.

B. Separately, the homogenization of powderous dielec-tric material (5) with a water-miscible organic solvent (4) was carried out at 45-50° C. with stirring at 100-150 r.p.m. for 15-20 minutes, under US irradiation at 200 kHz and energy of the US irradiation of 50 W/L of the liquid mixture.

C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture, which was subsequently cooled to r.t. with stirring, yielding the said composition in the form of a white-coloured, viscous, liquid suspension of a mild characteristic odour resembling isopropanol. Dynamic viscosity (η) was 233.8 [Pa·s]. The final product was packed into suitable metal or plastic containers.

Starting materials: [a] Product of company KG Zelina, Croatia; [b] Product of company BASF AG, Germany; [c] Product of company JRS Pharma GmbH & Co. KG, Ger-many; [d] Product of company Carlo Erba Reagents s.r.l., Italy; [e] Product of company Nanografi Nanotechnology, Turkey.

Example 8. Preparation of the Coating Composition According to the Subject Disclosure Composition (1000 g of the coating composition):

(1) 34.70% (347.00 g) demineralized water;[a]

(2) 4.00% (40.00 g) polymeric dispersant: polyvinylpyr-rolidone (PVP) of type Kollidon 30 ($M_r$=44,000-54,000);[b]

(3) 4.60% (46.00 g) polymeric binder: polyvinylalcohol (PVOH) of type Vivapharm PVA 05 fine; degree of hydrolysis: 85-89 mol %;[c]

(4) 44.00% (440.00 g) water-miscible solvent: isopropa-nol;[d] and (5) 12.70% (127.00 g) powderous dielectric material: barium titanate ($BaTiO_3$; crystal form: tetragonal; purity: ≥99.958; average particles size: 370 nm).[e]

Total: 100.00% (1000.00 g)

Preparation

A. The homogenization of polymeric dispersant (2) and polymeric binder (3) in demineralized water (1) was performed at 45-50° C., with stirring at 100-150 r.p.m. for 15-20 minutes, under ultrasonic (US) irradiation at 200 kHz and energy of US irradiation of 50 W/L of the liquid mixture.

B. Separately, the homogenization of powderous dielec-tric material (5) with a water-miscible organic solvent (4) was carried out at 45-50° C. with stirring at 100-150 r.p.m. for 15-20 minutes, under US irradiation at 200 kHz and energy of the US irradiation of 50 W/L of the liquid mixture.

C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture, which was subsequently cooled to r.t. with stirring, yielding the said composition in the form of a white-coloured, viscous, liquid suspension of a mild characteristic odour resembling isopropanol. Dynamic viscosity ($\eta$) was 0.1054 [Pa·s]. The final product was packed into suitable metal or plastic containers.

Starting materials: [a] Product of company KG Zelina, Croatia; [b] Product of company BASF AG, Germany; [c] Product of company JRS Pharma GmbH & Co. KG, Germany; [d] Product of company Carlo Erba Reagents s.r.l., Italy; [e] Product of company Nanografi Nanotechnology, Turkey.

Example 9. Preparation of the Coating Composition According to the Subject Disclosure Composition (1000 g of the coating composition):
(1) 35.70% (357.00 g) demineralized water;[a]
(2) 4.00% (40.00 g) polymeric dispersant: polyvinylpyrrolidone (PVP) of type Kollidon 30 ($M_r$=44,000-54,000);[b]
(3) 3.60% (36.00 g) polymeric binder: polyvinylalcohol (PVOH) of type Vivapharm PVA 05 fine; degree of hydrolysis: 85-89 mol %;[c]
(4) 44.00% (440.00 g) water-miscible solvent: isopropanol;[d] and
(5) 12.70% (127.00 g) powderous dielectric material: barium titanate ($BaTiO_3$; crystal form: tetragonal; purity: ≥99.958; average particles size: 370 nm).[e]
Total: 100.00% (1000.00 g)

Preparation

A. The homogenization of polymeric dispersant (2) and polymeric binder (3) in demineralized water (1) was performed at 45-50° C., with stirring at 100-150 r.p.m. for 15-20 minutes, under ultrasonic (US) irradiation 200 kHz and energy of US irradiation of 50 W/L of the liquid mixture.

B. Separately, the homogenization of powderous dielectric material (5) with a water-miscible organic solvent (4) was carried out at 45-50° C. with stirring at 100-150 r.p.m. for 15-20 minutes, under US irradiation at 200 kHz and energy of the US irradiation of 50 W/L of the liquid mixture.

C. The products from phase A and phase B were combined and homogenized by stirring at 100-150 r.p.m. at 45-50° C. for 15-20 minutes, under US irradiation at 200 kHz and energy of US irradiation of 50 W/L of the resulting liquid mixture,
which was subsequently cooled to r.t. with stirring, yielding the said composition in the form of: a white-coloured, viscous, liquid suspension of a mild characteristic odour resembling isopropanol. Dynamic viscosity ($\eta$) was 0.0937 [Pa·s]. The final product was packed into suitable metal or plastic containers.

Starting materials: [a] Product of company KG Zelina, Croatia; [b] Product of company BASF AG, Germany; [c] Product of company JRS Pharma GmbH & Co. KG, Germany; [d] Product of company Carlo Erba Reagents s.r.l., Italy; [e] Product of company Nanografi Nanotechnology, Turkey.

Conclusion

The coating composition according to the present invention provides a flexible dielectric coating within the RFID tag antennas. The effects of the flexible coat obtained from the subject composition include very high permittivity and permeability, increased frequency bandwidth, multi-frequency bands, increased gain, and increased half-power bandwidth. It improves read range on lossy materials, increases sensitivity, increases the read angles, can be used to match impedances, and has the option of making the tag electrically smaller. It can be also applied to other antennas in various industries. The mobile device, IoT, and UAV industries use PIFAs, helical antennas, dipoles antennas, and other antenna types.

In the real case measurements conducted with a high dielectric value film attached to various RFID tags, the signal gain was significantly increased by 25 dB to 30 dB. In wireless edge devices with a long life, this could mean a one thousand times decrease in communications power consumption and a significantly improved working of the device.

INDUSTRIAL APPLICABILITY

The coating composition from the subject disclosure is used for the manufacturing of flexible dielectric coatings, for the e.g., production of RFID tag antennas. Therefore, the industrial applicability of the present invention is obvious.

The invention claimed is:

1. A coating composition for room-temperature preparation of a flexible dielectric coating with high dielectric permittivity, comprising
   i. a dielectric material selected from the group consisting of barium titanate <$BaTiO_3$>, strontium titanate <$SrTiO_3$>, calcium copper titanate <$CaCu_3Ti_4O_{12}$>, cobalt (II) oxide, <$CoO$>, cobalt (II, III oxide) <$Co_3O_4$>, lanthanum oxide <$La_2O_3$>, conjugate polymers <CP>, and mixtures of these substances, of particle sizes 48-500 nm, from 15 to 30% w/w,
   ii. a polymeric dispersant comprising polyvinylpyrrolidone <PVP> having a relative molecular weight <Mr> from 44,000-54,000, from 1.00-10.00% w/w,
   iii. a polymeric binder comprising polyvinyl alcohol <PVOH>, from 1.00-10.00% w/w,
   iv. a water-miscible organic solvent, from 30.00-55.00% w/w,
   v. optionally, one or more auxiliary ingredients required for achieving particular technology properties of the resulting composition during the application via spraying or printing, the one or more auxiliary ingredients being one of a wetting agent, a plasticizer, an antifoaming agent, a corrosion inhibitor, an antioxidant, from 0.00-2.00% w/w,
   vi. a surfactant having a hydrophilic-lipophilic balance factor of 13-40 and present in an amount up to 2.00% w/w, and
   vii. a demineralized water, up to 100.00% of the composition,
   the water-miscible organic solvent is selected from the group consisting of isopropanol, n-propanol, and mixtures of isopropanol and n-propanol in a weight ratio with a low molecular weight aliphatic alcohol <ROH> selected from methanol, ethanol, n-butanol, isobutanol, sec-butanol, and tert-butanol, in a weight ratio of isopropanol and/or n-propanol: 1:3-3:1, w/w, and wherein said composition provides high dielectric permittivity and providing a signal gain increase of 25 dB to 30 dB when applied to an antenna.

2. The coating composition of claim 1, wherein the dielectric material is a conjugated polymer <CP> selected from the group consisting of polyaniline <PANI>, polyparaphenylene <PPP>, poly(p-phenylene vinylene) <PPV>, poly [2,5-di-(alkoxy)-p-phenylene vinylene], polyacetylene <PAC>, polyheptadiyne <PHT>, polythiophene <PTH>, poly(3-alkylthiophenes) <P3AT) like poly(3-hexylthiophene), <P3HT>, polypyrrole <PPy>, ladder-type polyphe-nylene <LPPP>, and mixtures thereof.

3. The coating composition of claim 1, wherein the polyvinyl alcohol <PVOH> has a relative molecular weight $<M_r>$ 10,000-500,000, and a hydrolysis degree of 85.0-100%.

4. The coating composition of claim 1, wherein the water-miscible organic solvent is isopropanol.

5. The coating composition of claim 1, comprising the following weight percentages:

The dielectric material 15.00-30.00% ww,

The polymeric dispersant 2.00-6.00% w/w,

The polymeric binder 2.00-6.00% w/w

The water-miscible organic solvent 35.00-50.00% w/w, the surfactant, from 0.05-0.10% w/w, and the demineralized water 25.00-40.00% w/w.

6. The coating composition of claim 1, comprising the following weight percentages:

The dielectric material 15.00-30.00% w/w,

The polymeric dispersant 3.50-4.50% w/w

The polymeric binder 3.50-4.50% w/w

The water-miscible organic solvent 38.00-45.00% w/w, the surfactant, from 0.05-0.10% w/w, and the demineralized water 30.00-35.00% w/w.

7. The coating composition of claim 1, wherein the surfactant is characterized by the hydrophilic-lipophilic balance <HLB> factor of 13-40, and is selected from the group consisting of:

an anionic surfactant selected from the group consisting of sodium stearate, sodium lauryl sulfate, sodium laureth sulfate, and potassium cetyl phosphate, a non-ionic surfactant selected from the group consisting of polyoxyethylene (20) stearyl ether, sorbitan monooleate, coco glucoside, and cocodiethanolamide;

a zwitterionic surfactant comprising cocoamidopropyl betaine, a cationic surfactant selected from benzyalkonium chloride and stearyl trimethylammonium chloride, and mixtures thereof.

8. The coating composition of claim 1, wherein the wetting agent is characterized by the hydrophilic-lipophilic balance <HLB> factor of 7-13 and is selected from the group consisting of:

an alkoxylated linear chain saturated fatty alcohols with C8-C18 carbon atoms with integrated 2-8 ethylene oxide <EO> units comprising polyoxyethylene (4) lauryl ether, an alkoxylated linear chain unsaturated fatty alcohols with C8-C18 carbon atoms with integrated 2-8 ethylene oxide <EO> units, an alkali metal sulfosuccinates comprising sodium bis(2-ethylhexyl) sulfosuccinate, an ammonium sulfosuccinates, and mixtures thereof.

9. The coating composition of claim 1, wherein the plasticizer is selected from the group consisting of epoxidized soybean oil <ESBO>, epoxidized linseed oil <ELO>, 3-hydroxy-2,2,4-trimethylpentyl isobutyrate, sebacates comprising di-octyl sebacate, 1,2-cyclohexane dicarboxylic acid diisononyl ester, bis(butylcarbitol) formal, and mixtures thereof.

10. The coating composition of claim 1, wherein the anti-foaming agent is selected from the group consisting of silicone oils comprising polydimethysiloxane, C6-C22 higher fatty alcohols, mineral oil, and mixtures thereof.

11. The coating composition of claim 1, wherein the corrosion inhibitor is selected from the group consisting of:

An inorganic salt selected from the group consisting of sodium silicate, potassium silicate, sodium borate, potassium borate, sodium tetraborate, potassium tetraborate, tripotassium phosphates, trisodium phosphates, potassium nitrite, and sodium nitrite, a mercaptobenzothiazole <MBT>, an amine, selected from the group consisting of primary amine, secondary amine, tertiary amine, diamine, and triamines, wherein alkyl group is selected from C2-C8 alkyl groups, comprising n-butylamine, diisopropylamine, triethylamine, ethylenediamine, and dipropylene triamine <DPTA>, a hydroxy alkylamine selected from the group consisting of primary hydroxy alkylamine, secondary hydroxy alkylamine, and tertiary hydroxy alkylamine, comprising ethanolamine and methyl dethanolamine, analkoxy alkyolamine selected from the group consisting of primary alkoxy alkylamine, secondary alkoxy alkylamine, and tertiary alkoxy alkylamine, comprising 3-methoxypropylamine, a cyclic amine selected from the group consisting of morpholine, piperazine, mono-alkyl derivatives thereof with 1-6 carbon atoms in the alkyl group comprising N-methyl-morpholine, and di-alkyl derivatives thereof with 1-6 carbon atoms in the alkyl group comprising 1,4-dimethyl-piperazine, and salts of said amines with weak acids selected from the group consisting of carboxylic acid like acetic, benzoic, citric acid, 4-oxo-4-(para-tolyl) butyric acid, and mixtures thereof.

12. The coating composition of claim 1, wherein the antioxidant is one or more substances selected from the group consisting of 2,6-di-tert-butyl-4-methylphenol <BHT>, butylated hydroxyanisole <BHA>, 2,4-dimethyl-6-tert-butylphenol, and N,N'-di(2-butyl)-1,4-phenylene diamine, without or with one or more auxiliary antioxidant selected from the group comprising disodium edetate dihydrate $<Na_2EDTA \cdot 2H_2O>$, trisodium citrate dihydrate $<Na_3C_6H_5O_7 \cdot 2H_2O>$, and sodium phytate $<Na_{12}C_6H_6(OPO_3)_6>$.

13. The coating composition of claim 1, wherein the polyvinyl alcohol <PVOH> has a relative molecular weight $M_r$ 30,000-200,000, and a hydrolysis degree of 85.0-100%.

\* \* \* \* \*